March 30, 1926. 1,578,606
F. W. LEUTHESSER
HUMIDIFIER FOR INTERNAL COMBUSTION ENGINES
Filed Oct. 29, 1921
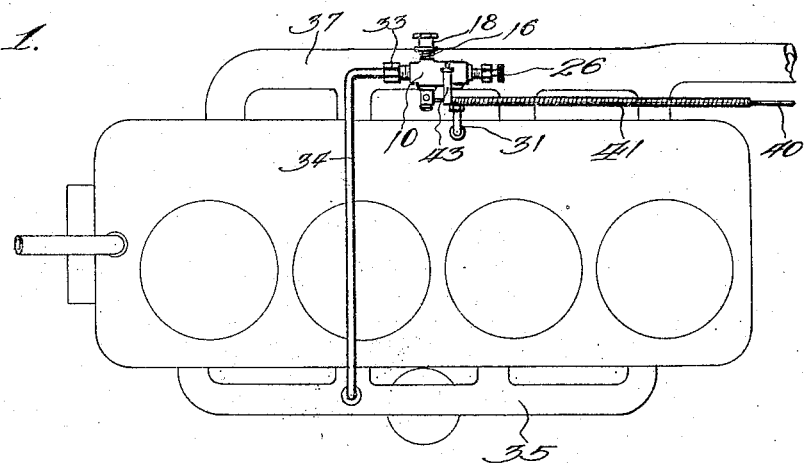
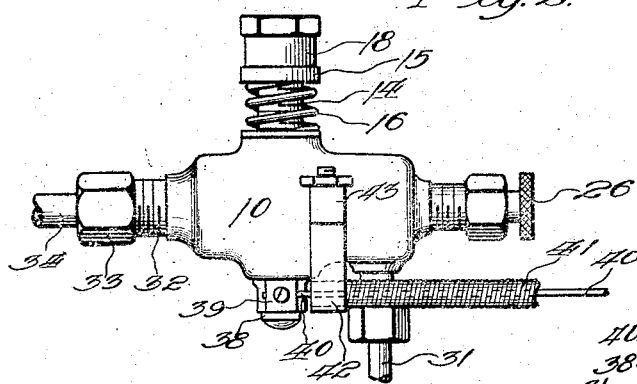
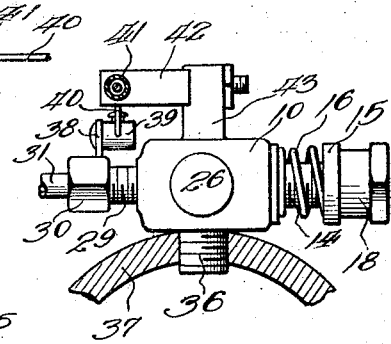
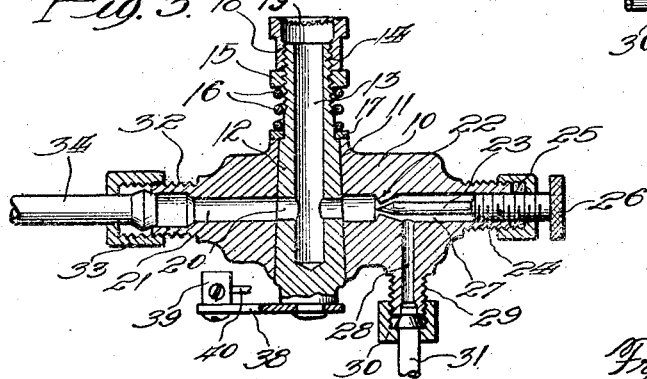
Inventor:
Fred W. Leuthesser
By Denning & Denning
Attys Patented Mar. 30, 1926.

1,578,606

UNITED STATES PATENT OFFICE.

FRED W. LEUTHESSER, OF OAK PARK, ILLINOIS.

HUMIDIFIER FOR INTERNAL-COMBUSTION ENGINES.

Application filed October 29, 1921. Serial No. 511,468.

*To all whom it may concern:*

Be it known that I, FRED W. LEUTHESSER, a citizen of the United States, residing at Oak Park, in the county of Cook and State of Illinois, have invented certain new and useful Improvements in Humidifiers for Internal-Combustion Engines, of which the following is a specification.

It has been found in the operation of hydrocarbon engines that the admixture of a small amount of steam or water vapor to the gasoline mixture admitted through the intake manifold tends to prevent the accumulation of carbon in the cylinders and valves.

The present invention pertains to a humidifier for regulating the admission of steam or water vapor and air in the proper amounts to conform with the requirements above outlined.

The object of the invention is to so arrange the air and vapor inlets that the proper proportionate ratio between air and vapor will be maintained irrespective of the volume of the mixture admitted and also provide means for adjusting the vapor inlet to secure the best results.

A further object is to render the device positive in its action and to eliminate the use of springs or the like which tend to corrode or lose their elasticity, and thereby interfere with the engine adjustments.

In the drawing:

Figure 1 is a top or plan view of an internal combustion engine showing the general location and arrangement of the device with respect to the engine structure;

Fig. 2 is a top or plan view, enlarged, of the humidifier;

Fig. 3 is a sectional plan view of the same; and

Fig. 4 is an end elevation showing the method of attachment to the exhaust manifold of the engine.

The device as a whole comprises a valve casing 10 of elongated formation which is divided through its center by a transversely extending tapered bore 11 which receives a tapered valve plug 12 having a center bore 13 constituting an air inlet passage. The reduced end of the valve plug terminates in a threaded stem 14 which receives an adjusting nut 15 bearing against a spring 16 interposed between the nut and the washer 17, so that a regulation of the nut will serve to regulate the spring tension on the valve plug. The outer end of the threaded stem receives an open ended threaded cap 18 provided with a screen 19 for preventing the ingress of dirt or the like and the threaded cap serves the function of a jamb nut for locking the adjusting nut 15 in position.

The valve plug is also provided with a cross bore 20 which intersects the center bore 13, which cross bore communicates with a steam or air passage 21 extending through the valve casing in transverse relation to the cross bore which carries the plug. On the intake side of the valve plug, the passage 21 is reduced at the point 22 to afford a tapered valve seat which co-acts with a needle valve 23 provided with a threaded stem 24 entered through a gland 25 and terminating in a knurled head 26 for adjusting purposes.

The needle valve is entered through a vapor passage 27 whch communicates with a transversely extending vapor inlet passage 28 bored through a nipple 29 which carries a coupling 30, the latter serving to make connection with a vapor supply pipe 31, which is tapped into the water jacket of the engine at any convenient point. The air and vapor passage 21 leads through a discharge nipple which carries a coupling 33, the latter making connection with a discharge pipe 34 which leads to the inlet manifold 35. In order to heat the humidifier to a fairly high degree of temperature for the purpose of maintaining the water in the form of vapor or steam, the humidifier is perferably secured by means of a threaded stud 36 to the exhaust manifold 37 of the engine.

The tapered plug 12 at its enlarged end has connected thereto an arm 38 which carries a head plug 39 bored to receive a thin wire rod 40, which latter is slidably entered through a flexible tubing 41 perferably of coiled wire construction leading to the dash board or other convenient point of control. The forward end of the tubing 41 is screwed or otherwise rigidly held within a bracket arm 42 carried by a standard 43 upstanding from the shell of the carburetor.

The method of securing the humidifier to the engine may be varied to suit the conditions encountered, and the vertical and horizontal relation of the parts shown is merely relative, since the device might be secured to the side of the exhaust manifold rather than to the top thereof, in which case the vertical and horizontal relations would be transposed.

In use the needle valve will be adjusted to the desired degree to best subserve the requirements of the engine, after which further adjustment save from the dash board is unnecessary.

When the tapered plug is turned to bring its cross bore into transverse relation to the longitudinal passage 21, the supply both of air and vapor will be cut off, but when the plug is turned to the position shown in Fig. 3 a full supply of air and vapor will be sucked into the intake manifold and mixed with the incoming supply of gas and air from the gas carburetor. Of course, the valve plug can be adjusted to any intermediate position as occasion may require. The arrangement is one which simplifies the construction and renders the adjustments positive and affords means for easily connecting the device to any engine of ordinary structure.

I claim:

1. In a humidifier for internal combustion engines, the combination of a casing provided with a longitudinal bore, a transverse bore and a vapor inlet passage connecting with the longitudinal bore, a valve plug rotatably mounted in the transverse bore and provided with a longitudinally extending air inlet passage intersecting a transverse plug passage, the latter being adapted, by rotative adjustment of the plug, to be brought into register with the longitudinal passage in the casing, a valve for controlling the admission of vapor into the longitudinal passage in the casing, and means for rotating the plug, substantially as described.

2. In a humidifier for internal combustion engines, the combination of a casing provided with a longitudinal bore, a transverse bore and a vapor inlet passage connecting with the longitudinal bore, a valve plug rotatably mounted in the transverse bore and provided with a longitudinally extending air inlet passage intersecting a transverse plug passage, the latter being adapted, by rotative adjustment of the plug, to be brought into register with the longitudinal passage in the casing, a valve for controlling the admission of vapor into the longitudinal passage in the casing, means for rotating the plug, a vapor supply pipe connected with the vapor inlet passage, and an air and vapor discharge pipe connected with the longitudinal passage in the casing, substantially as described.

FRED W. LEUTHESSER.